US012725907B2

(12) United States Patent
Shoji et al.

(10) Patent No.: US 12,725,907 B2
(45) Date of Patent: Sep. 1, 2026

(54) VEHICLE ANTENNA DEVICE

(71) Applicant: AGC Inc., Tokyo (JP)

(72) Inventors: Hideaki Shoji, Tokyo (JP); Jun Noda, Tokyo (JP); Tomohiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 236 days.

(21) Appl. No.: 18/627,089

(22) Filed: Apr. 4, 2024

(65) Prior Publication Data

US 2024/0250404 A1 Jul. 25, 2024

Related U.S. Application Data

(63) Continuation of application No. PCT/JP2022/037253, filed on Oct. 5, 2022.

(30) Foreign Application Priority Data

Oct. 8, 2021 (JP) ................................ 2021-166222

(51) Int. Cl.
*H01Q 1/12* (2006.01)
*H01Q 1/32* (2006.01)
*H01Q 21/28* (2006.01)

(52) U.S. Cl.
CPC ......... *H01Q 1/1271* (2013.01); *H01Q 1/3275* (2013.01); *H01Q 21/28* (2013.01)

(58) Field of Classification Search
None
See application file for complete search history.

(56) References Cited

U.S. PATENT DOCUMENTS 7,180,473 B2 2/2007 Horie et al.

FOREIGN PATENT DOCUMENTS

| | | | | |
|---|---|---|---|---|
| CN | 112534979 A * | 3/2021 | ............. A01G 13/33 |
| JP | 2007-174034 A | 7/2007 | |
| JP | 2009-253947 A | 10/2009 | |
| JP | 2020-136880 A | 8/2020 | |
| WO | WO-2018/079415 A1 | 5/2018 | |
| WO | WO-2019/181623 A1 | 9/2019 | |

* cited by examiner

*Primary Examiner* — Crystal L Hammond
(74) *Attorney, Agent, or Firm* — Foley & Lardner LLP

(57) ABSTRACT

To provide a vehicle antenna device which includes multiple antennas, the frequency bands of radio waves to be transmitted and received by the multiple antennas being at least partially different from each other, proximate to each other and which can reduce the degradation of the transmission/reception sensitivity of each of the multiple antennas.

A vehicle antenna device to be mounted on a vehicle, comprising:

a first antenna capable of transmitting and receiving radio waves of a first frequency band; and a second antenna proximate to the first antenna and capable of transmitting and receiving radio waves of a second frequency band including a frequency band higher than the first frequency band, wherein at least one of the first antenna and the second antenna is disposed in or on window glass of the vehicle or in the vicinity of the window glass, and wherein the second antenna includes a power supply unit to which a high-pass filter is connected.

20 Claims, 6 Drawing Sheets

VEHICLE ANTENNA DEVICE

This application is a continuation of PCT Application No. PCT/JP2022/037253, filed on Oct. 5, 2022, which is based upon and claims the benefit of priority from Japanese Patent Application No. 2021-166222, filed Oct. 8, 2021. The contents of those applications are incorporated herein by reference in their entireties.

TECHNICAL FIELD

The present disclosure relates to a vehicle antenna device.

BACKGROUND ART

In recent years, it is not unusual that a variety of electronic devices, such as visible light cameras, radars, and sensors, are installed on or near window glass of a vehicle. In some vehicles, an antenna pattern for receiving broadcast waves is disposed on the window glass of a vehicle, such as on the windshield. However, if an electronic device and an antenna pattern are placed close to each other so as not to block the view through the window glass too much, some problems may arise, such that the operation of the antenna becomes unstable and the antenna gain is lowered.

Thus, the following technology is known such that a noise removing pattern is disposed between an electronic device and an antenna so as to absorb noise coming from the electronic device to the antenna and to reduce the noise reaching the antenna (see Patent Document 1, for example). The following technology is also known: a canceling element is disposed between an electronic device and an antenna so as to reduce noise coming from the electronic device to the antenna (see Patent Document 2, for example).

PRIOR ART DOCUMENTS

Patent Documents

Patent Document 1: WO2019/181623
Patent Document 2: WO2018/079415

DISCLOSURE OF INVENTION

Technical Problem

Lately, to support high-speed, high-capacity communication standards, such as 4GLTE and 5G (sub6), antennas that can be mounted on vehicles, such as so-called "connected cars", have been developing. For example, in addition to broadcast antennas (such as DAB (Digital Audio Broadcasting) antennas supporting 174 to 270 MHz and digital terrestrial television broadcast antennas supporting 470 to 710 MHZ), communication antennas utilizing a frequency band up to 6 GHz have also been developing.

An example of such communication antennas is V2X (Vehicle to Everything) antenna, which is highly expected to be used for vehicle-to-vehicle communication and vehicle-to-road communication. The V2X antenna is capable of transmitting and receiving radio waves of a narrowband, such as a 5.8 GHz band and a 5.9 GHz band, for example, and is used for various purposes, such as the European ETC (Electronic Toll Collection) system.

If multiple antennas, the frequency bands of radio waves to be transmitted and received by the multiple antennas being at least partially different from each other, are placed proximate to each other, the transmission/reception sensitivity of each antenna may be degraded.

According to an embodiment of the present disclosure, provided is a vehicle antenna device which includes multiple antennas, the frequency bands of radio waves to be transmitted and received by the multiple antennas being at least partially different from each other, proximate to each other and which can reduce the degradation of the transmission/reception sensitivity of each of the multiple antennas.

Solution to Problem

According to an embodiment of the present disclosure, provided is a vehicle antenna device to be mounted on a vehicle, comprising:

a first antenna capable of transmitting and receiving radio waves of a first frequency band; and a second antenna proximate to the first antenna and capable of transmitting and receiving radio waves of a second frequency band including a frequency band higher than the first frequency band, wherein at least one of the first antenna and the second antenna is disposed in or on window glass of the vehicle or in the vicinity of the window glass, and wherein the second antenna includes a power supply unit to which a high-pass filter is connected.

Advantageous Effects of Invention

According to an embodiment of the present disclosure, in the configuration in which multiple antennas, the frequency bands of radio waves to be transmitted and received by the multiple antennas being at least partially different from each other, are placed proximate to each other, the transmission/reception sensitivity of each of the multiple antennas is less likely to be degraded.

DESCRIPTION OF EMBODIMENTS

Figure 1:
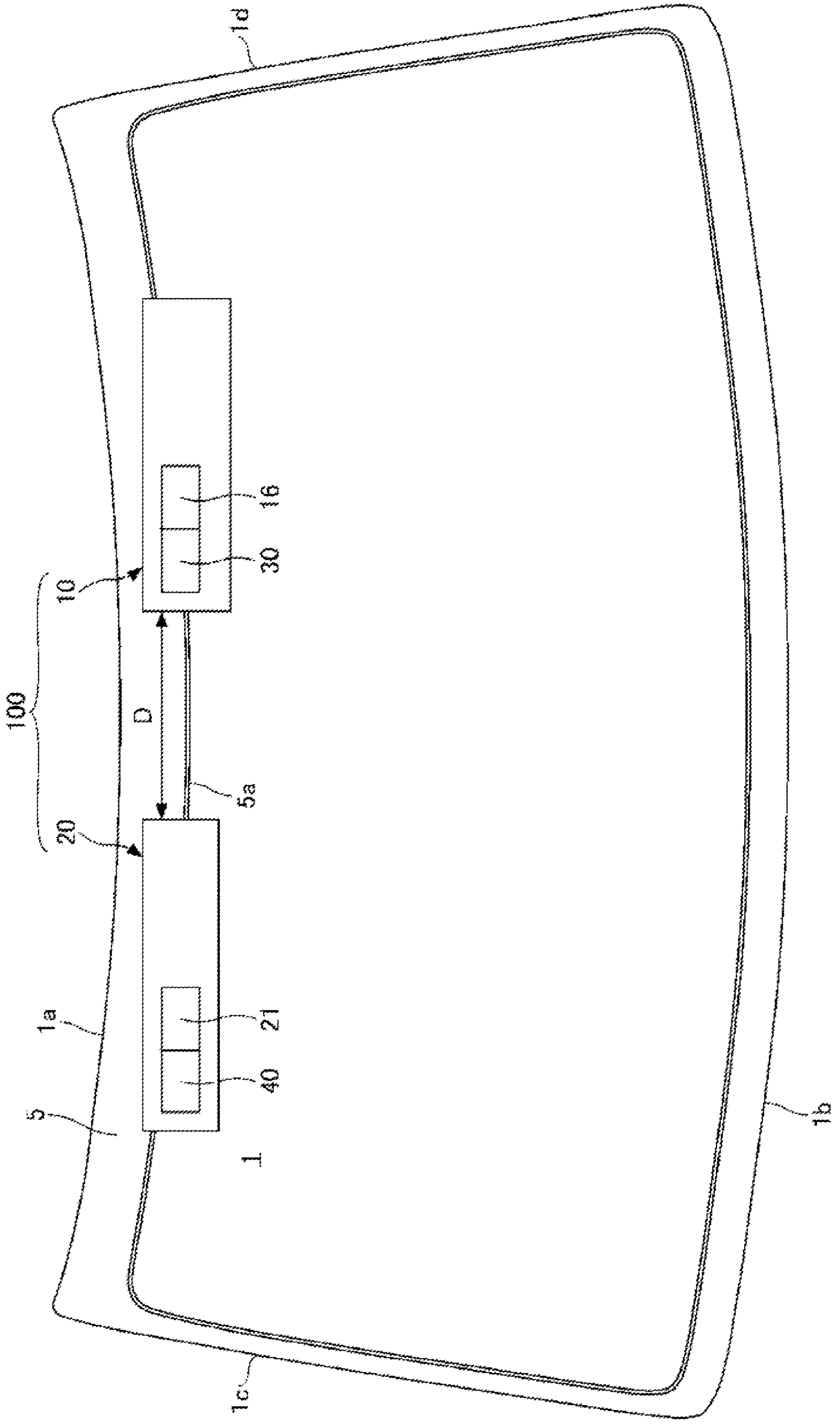
FIG. 1 is a view schematically illustrating an example of the configuration of a vehicle window glass device according to an embodiment in a plan view of window glass.

An embodiment of the present disclosure will now be described below with reference to the drawing. For easy understanding of the embodiment, the scales of the individual elements in the drawings discussed in the embodiment may be represented differently from those of the actual elements. Terms representing directions, such as "parallel", "at right angles", "perpendicular", "horizontal", "vertical", "top-bottom", and "left-right", are not necessarily to be interpreted in an exact sense, and a certain range of deviation is allowed as long as the operations and the effects of the embodiment are not impaired.

Examples of the window glass of a vehicle in the embodiment are rear glass fixed to the rear side of the vehicle, a windshield fixed to the front side of the vehicle, side glass fixed to the lateral sides of the vehicle, and roof glass fixed to the ceiling of the vehicle. However, the window glass is not limited to these examples.

FIG. 1 is a view schematically illustrating an example of the configuration of a vehicle antenna device according to the embodiment in a plan view of the window glass. An antenna device 100 shown in FIG. 1 is an example of a vehicle antenna device to be mounted on a vehicle. The antenna device 100 includes an antenna 10 and another antenna 20 proximate to the antenna 10. The antenna 10 is an example of a first antenna capable of transmitting and receiving radio waves of a first frequency band. The antenna 20 is an example of a second antenna capable of transmitting and receiving radio waves of a second frequency band which includes a frequency band higher than the first frequency band.

"Transmit and receive" means one or both of transmission and reception. Transmit and receive radio waves of the first frequency band may mean transmit and receive radio waves of some frequency bands included in the first frequency band and may also mean transmit and receive radio waves of all the frequency bands of the first frequency band. Transmit and receive radio waves of the second frequency band may mean transmit and receive radio waves of some frequency bands included in the second frequency band and may also mean transmit and receive radio waves of all the frequency bands of the second frequency band.

The first frequency band is UHF (Ultra High Frequency) band in a range of 300 MHz to 3 GHZ, VHF (Very High Frequency) band in a range of 30 to 300 MHz, or a band covering both of UHF band and VHF band, for example. A specific example of the frequency bands included in UHF band is digital terrestrial television broadcast band (470 to 710 MHz, for example). Specific examples of the frequency bands included in VHF band are FM broadcast band (76 to 108 MHZ, for example) and band III of DAB broadcast (174 to 240 MHz, for example).

The second frequency band is a radio frequency band of microwaves and millimeter waves (0.3 to 300 GHz, for example), for example. Specific examples of the frequency bands included in the second frequency band are sub6 band (3.6 to 6 GHZ, for example), 2.4 GHz band, 5.2 GHZ, band, 5.3 GHZ band, 5.6 GHz band, 5.8 GHZ band, and 5.9 GHz band.

The low frequency range of the second frequency band and the high frequency range of the first frequency band may overlap each other, or may not overlap each other. For example, the second frequency band may be in a range of 617 MHz and higher, while the first frequency band may be in a range of 710 MHz and lower.

The antenna 20 is applicable to V2X communication system, 5G, 6G, and vehicle radar system. However, the antenna 20 may be applicable to other systems. Specific examples of V2X communication system are a vehicle-to-vehicle communication system and a vehicle-to-road communication system (ETC system, for example).

At least one of the antennas 10 and 20 is disposed on or in the vicinity of window glass 1. The vicinity of the window glass 1 includes, for example, the indoor space of the vehicle separated from the glass surface of the window glass 1 by a range of more than 0 mm up to 100 mm. In this case, the radiating surface of the antenna (antenna 20, for example) may be located to face the glass surface of the window glass 1 via a dielectric member. The vicinity of the window glass 1 is not restricted to the indoor space of the vehicle, but may be the outdoor space of the vehicle separated from the glass surface of the window glass 1 by a range of more than 0 mm up to 100 mm. In one example of such a case, one of the antennas (antenna 20, for example) is contained in a roof spoiler provided near the rear glass outside the vehicle compartment and the radiating surface of this antenna is separated from the glass surface of the rear glass by a range of more than 0 mm up to 100 mm, while the other antenna (antenna 10, for example) is disposed on the glass surface of the rear glass. The mode in which the antenna is disposed in the vicinity of the window glass 1 may include a mode in which the antenna is mounted on a rear side device installed near the rear glass (a high mount stop lamp or a rearview camera, for example) or a mode in which the antenna is disposed in the vicinity of a rear side device. FIG. 1 illustrates the mode in which both of the antennas 10 and 20 are disposed on the surface of the window glass 1 as an example.

At least one of the antennas 10 and 20 may be located on a light shielding film 5 formed on the glass surface at the periphery of the window glass 1. Part of or the entirety of the antenna 10 may be located on the light shielding film 5, and part of or the entirety of the antenna 20 may be located on the light shielding film 5. A specific example of the light shielding film 5 is a ceramic film, such as a black enamel film. When the window glass 1 is viewed from outside of the vehicle, the edge portion of the window glass 1 farther outward than an inner edge 5*a* of the light shielding film 5 can hardly be viewed from the outside, and design quality is thus improved.

At least one of the antennas 10 and 20 may be disposed in a location other than along a glass edge 1*a* on the top side of the window glass 1 as shown in FIG. 1 (in other words, the edge of the top side of a window frame, which is not shown, to which the window glass 1 is attached). For example, at least one of the antennas 10 and 20 may be disposed along a glass edge 1*b* of the bottom side of the window glass 1 (edge of the bottom side of the window frame), a glass edge 1*c* on the left side of the window glass 1 (edge of the left side of the window frame), or a glass edge 1*d* on the right side of the window glass 1 (edge of the right side of the window frame).

The antenna 20 includes an antenna element, which is not shown, and a power supply unit 21 to be electrically connected to a power supply line or an amplifier, which is not shown. The power supply unit 21 is a power supply point that connects the power supply line or the amplifier and the antenna element, and is a power supply electrode, for example. The power supply unit 21 may be a monopole type or a dipole type. That is, the antenna 20 may be a monopole antenna using an external ground, such as a metal body of the vehicle, or may be a dipole antenna having an antenna element and a ground element.

A high-pass filter 40 is connected to the power supply unit 21. The power supply line or the amplifier, which is not shown, is connected to the power supply unit 21 via the high-pass filter 40. The high-pass filter 40 is a circuit that allows a signal of the second frequency band to pass therethrough substantially without attenuating this signal and that attenuates a signal of the first frequency band by a greater amount than a signal of the second frequency band.

As a result of the high-pass filter 40 being connected to the power supply unit 21, isolation between the antennas 10 and 20 in the first frequency band can be secured. This can reduce the degradation of the transmission/reception sensitivity of each of the antennas 10 and 20 even though the antennas 10 and 20 are placed proximate to each other. For example, noise containing components of the first frequency band radiating from the antenna 20 is suppressed by the high-pass filter 40, whereby a decrease in the antenna gain of the antenna 10 in the first frequency band can be suppressed. Additionally, for example, noise containing components of the first frequency band leaking from the antenna 10 to the antenna 20 is suppressed by the high-pass filter 40, whereby a decrease in the antenna gain of the antenna 20 in the low frequency range of the second frequency band can be suppressed.

The antenna 10 includes an antenna element, which is not shown, and a power supply unit 16 to be electrically connected to a power supply line or an amplifier, which is not shown. The power supply unit 16 is a power supply point that connects the power supply line or the amplifier and the antenna element, and is a power supply electrode, for example. The power supply unit 16 may be a monopole type or a dipole type. That is, the antenna 10 may be a monopole antenna using an external ground, such as a metal body of the vehicle, or may be a dipole antenna having an antenna element and a ground element.

A low-pass filter 30 may be connected to the power supply unit 16. The power supply line or the amplifier, which is not shown, is connected to the power supply unit 16 via the low-pass filter 30. The low-pass filter 30 is a circuit that allows a signal of the first frequency band to pass therethrough substantially without attenuating this signal and that attenuates a signal of the second frequency band by a greater amount than a signal of the first frequency band.

As a result of the low-pass filter 30 being connected to the power supply unit 16, isolation between the antennas 10 and 20 in the second frequency band can be secured. This can reduce the degradation of the transmission/reception sensitivity of each of the antennas 10 and 20 even though the antennas 10 and 20 are placed proximate to each other. For example, noise containing components of the second frequency band radiating from the antenna 10 is suppressed by the low-pass filter 30, whereby a decrease in the antenna gain of the antenna 20 in the second frequency band can be suppressed. Additionally, for example, noise containing components of the second frequency band leaking from the antenna 20 to the antenna 10 is suppressed by the low-pass filter 30, whereby a decrease in the antenna gain of the antenna 10 in the high frequency range of the first frequency band can be suppressed.

The distance D between the antennas 10 and 20 is preferably 5 to 100 mm in terms of reducing the degradation of the transmission/reception sensitivity of each of the antennas 10 and 20. If the distance D is smaller than 5 mm, the physical distance between the antennas 10 and 20 becomes too short, and the effect of reducing the degradation of the transmission/reception sensitivity exhibited by the high-pass filter 40 is impaired. If the distance D exceeds 100 mm, the antennas 10 and 20 are excessively separated from each other, and it is difficult to secure a space in which the antennas 10 and 20 are installed. If the distance D between the antennas 10 and 20 becomes long in excess of 100 mm, a certain level of isolation in a predetermined frequency band can easily be secured even without providing the high-pass filter 40. In terms of reducing the degradation of the transmission/reception sensitivity of each of the antennas 10 and 20, the lower limit of the distance D is more preferably 10 mm or larger and even more preferably 15 mm or larger, while the higher limit of the distance D is more preferably 90 mm or smaller and even more preferably 80 mm or smaller. The distance D is the shortest distance between the antennas 10 and 20 and is, for example, the shortest distance between the antenna element of the antenna 10 and that of the antenna 20. The distance D may be the shortest distance between a portion of the antenna element where the highest current flows of one of the antennas 10 and 20 and such a portion of the other one of the antennas 10 and 20.

Figure 2:
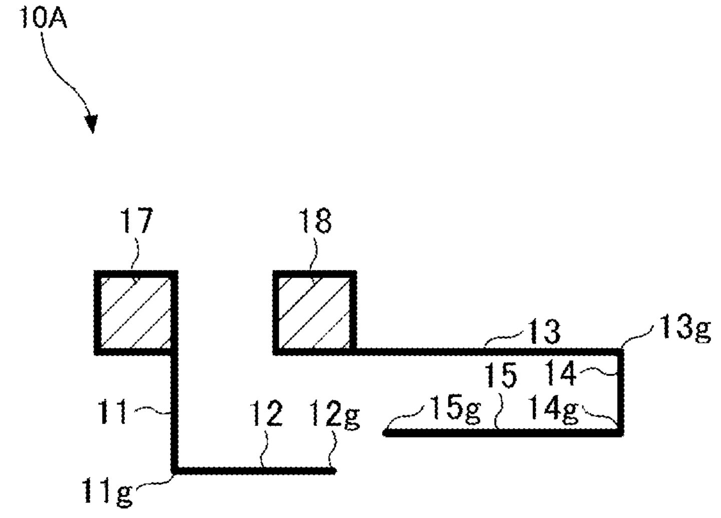
FIG. 2 is a schematic view illustrating an example of the configuration of a first antenna capable of transmitting and receiving radio waves of a first frequency band in a plan view.

FIG. 2 is a schematic view illustrating an example of the configuration of the first antenna capable of transmitting and receiving radio waves of the first frequency band in a plan view.

An antenna 10A shown in FIG. 2 is an example of the antenna 10 shown in FIG. 1, and is a linear antenna provided on the surface of the window glass 1, for example. A power supply point 18 and a ground point 17 shown in FIG. 2 are an example of the power supply unit 16 (see FIG. 1) of a dipole type. The antenna 10A is a dipole planar antenna having the power supply point 18 and the ground point 17, for example. The power supply point 18 is a portion to be electrically connected to a power supply line for causing a radio-frequency signal to pass therethrough and is, for example, a power supply electrode to be electrically connected to the input terminal of an amplifier. The ground point 17 is a portion to be grounded to an external ground and is, for example, a ground electrode to be electrically connected to a ground of an amplifier. The low-pass filter 30 shown in FIG. 1 is connected to the power supply point 18 and the ground point 17.

In FIG. 2, the antenna 10A includes plural antenna elements connected to the power supply point 18 and plural ground elements to be connected to the ground point 17. The power supply point 18 and the ground point 17 are separated from each other in a predetermined reference direction (in the horizontal direction or in the substantially horizontal direction, for example).

The antenna 10A has ground elements including ground elements 11 and 12. The ground element 11 is a first ground element extending in a first direction (downward in FIG. 2), which is a direction at right angles or substantially at right angles to the predetermined reference direction, starting from the ground point 17. The ground element 12 is a second ground element extending in a second direction, which is a direction parallel with the reference direction and extending from the ground element 11 toward the power supply point 18, starting from a first terminating portion 11*g*, which is an end point of the ground element 11 extending in the first direction, until a second terminating portion 12*g*. The antenna 10A can be adjusted to receive digital terrestrial television broadcast radio waves, for example.

The antenna 10A has antenna elements including antenna elements 13, 14, and 15. The antenna element 13 is a first antenna element extending in the second direction starting from the power supply point 18. The antenna element 14 is a second antenna element extending in the first direction starting from a third terminating portion 13*g*, which is an end point of the antenna element 13 extending in the second direction. The antenna element 15 is a third antenna element extending in a third direction, which is the opposite direction of the second direction, starting from a fourth terminating portion 14*g*, which is an end point of the antenna element 14 extending in the first direction, until a fifth terminating portion 15*g*.

The configuration of the first antenna capable of transmitting and receiving radio waves of the first frequency band is not limited to the mode shown in FIG. 2 and may be formed in a different mode. For example, the first antenna is not restricted to a dipole antenna and may be a monopole antenna, a patch antenna, or a slot antenna. The patch antenna is a planar antenna having a dielectric layer between a radiation conductor and a ground conductor, for example.

Figure 3:
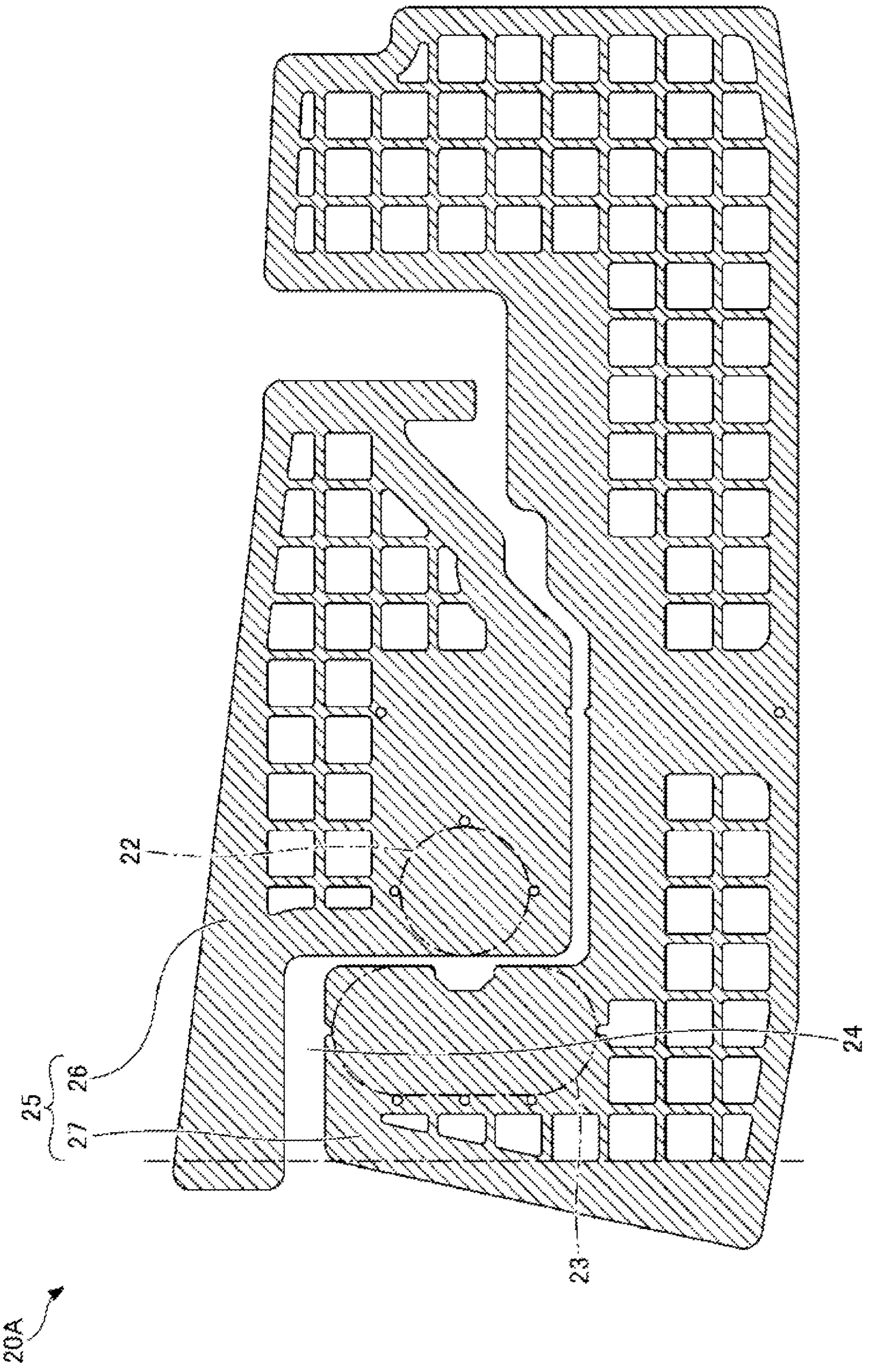
FIG. 3 is a schematic view illustrating an example of the configuration of a second antenna capable of transmitting and receiving radio waves of a second frequency band in a plan view.

FIG. 3 is a schematic view illustrating an example of the configuration of the second antenna capable of transmitting and receiving radio waves of the second frequency band in a plan view. The configuration of the second antenna capable of transmitting and receiving radio waves of the second frequency band is not limited to the mode shown in FIG. 3 and may be formed in a different mode.

An antenna 20A shown in FIG. 3 is an example of the antenna 20 shown in FIG. 1, and is, for example, a planar antenna provided on the surface of the window glass 1. A power supply point 22 and a ground point 23 shown in FIG. 3 are an example of the power supply unit 21 (see FIG. 1) of a dipole type. The antenna 20A is a dipole planar antenna having the power supply point 22 and the ground point 23, for example. The power supply point 22 is a portion to be electrically connected to a power supply line for causing a radio-frequency signal to pass therethrough and is, for example, a power supply electrode to be electrically connected to the output terminal of an output amplifier or the input terminal of an input amplifier. The ground point 23 is a portion to be grounded to an external ground and is, for example, a ground electrode to be electrically connected to a ground of an amplifier. The high-pass filter 40 shown in FIG. 1 is connected to the power supply point 22 and the ground point 23.

In FIG. 3, the antenna 20A is a slot antenna formed on a conductive film 25. The antenna 20A functions as a slot antenna as a result of a slot 24 (narrow cutout) being formed in the conductive film 25. The conductive film 25 includes an antenna element 26 extending on one side with respect to the slot 24 and a ground element 27 extending on the other side with respect to the slot 24.

The configuration of the second antenna capable of transmitting and receiving radio waves of the second frequency band is not limited to the mode shown in FIG. 3 and may be formed in a different mode. For example, the second antenna is not restricted to a dipole planar antenna and may be a monopole planar antenna or a patch antenna.

Figure 4:
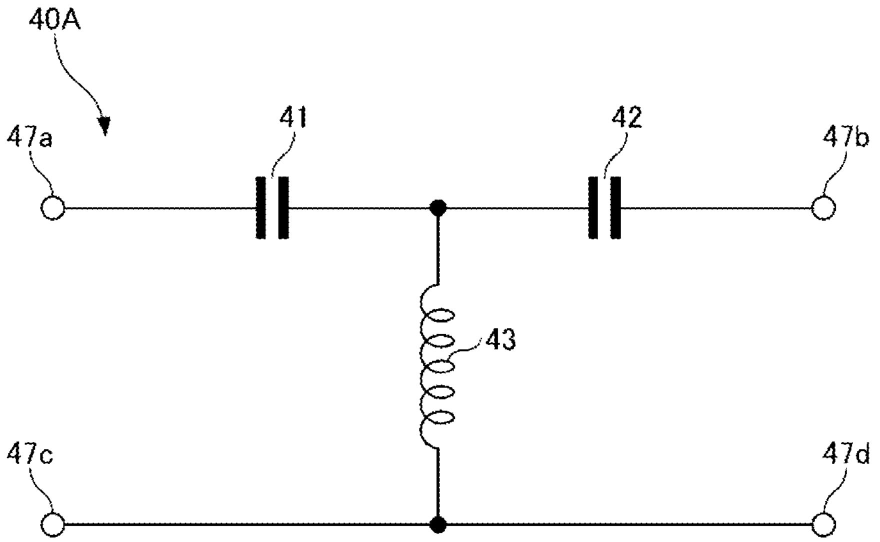
FIG. 4 is a circuit diagram illustrating a first example of the configuration of a high-pass filter.

FIG. 4 is a circuit diagram illustrating a first example of the configuration of a high-pass filter. A high-pass filter 40A shown in FIG. 4 is an example of the high-pass filter 40. The high-pass filter 40A is a T-form high-pass filter. In the example in FIG. 4, the high-pass filter 40A includes terminals 47*a*, 47*b*, 47*c*, and 47*d*, capacitors 41 and 42, and an inductor 43. More specifically, the capacitors 41 and 42 are connected in series between the terminals 47*a* and 47*b*, and the inductor 43 is connected at one end between the capacitors 41 and 42 and at the other end to a position which is at a ground potential (the same potential as the terminals 47*c* and 47*d*).

In a case where the power supply unit of the antenna is a dipole type, the terminal 47*a* is electrically connected to a power supply line or an amplifier, the terminal 47*b* is electrically connected to the power supply point of the power supply unit, the terminal 47*c* is electrically connected to an external ground, and the terminal 47*d* is electrically connected to the ground point of the power supply unit, for example. If the power supply unit of the antenna is a monopole type, the terminal 47*a* is electrically connected to a power supply line or an amplifier, the terminal 47*b* is electrically connected to the power supply point of the power supply unit, and the terminals 47*c* and 47*d* are electrically connected to an external ground, for example.

In the configuration in which a T-form high-pass filter, such as the high-pass filter 40A, is connected to the antenna 20, a portion between the antenna 20 and an external ground becomes nearly in the open circuit state in the first frequency band. Isolation between the antennas 10 and 20 can thus be secured in the open circuit state in the first frequency band.

Figure 5:
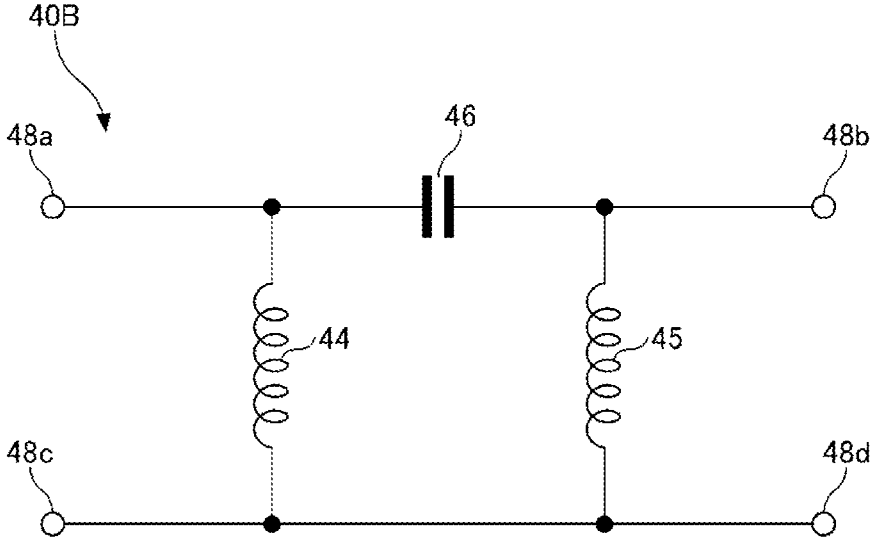
FIG. 5 is a circuit diagram illustrating a second example of the configuration of a high-pass filter.

FIG. 5 is a diagram illustrating a second example of the configuration of a high-pass filter. A high-pass filter 40B shown in FIG. 5 is an example of the high-pass filter 40. The high-pass filter 40B is a I-form high-pass filter. In the example in FIG. 5, the high-pass filter 40B includes terminals 48*a*, 48*b*, 48*c*, and 48*d*, a capacitor 46, and inductors 44 and 45.

In a case where the power supply unit of the antenna is a dipole type, the terminal 48*a* is electrically connected to a power supply line or an amplifier, the terminal 48*b* is electrically connected to the power supply point of the power supply unit, the terminal 48*c* is electrically connected to an external ground, and the terminal 48*d* is electrically connected to the ground point of the power supply unit, for example. If the power supply unit of the antenna is a monopole type, the terminal 48*a* is electrically connected to a power supply line or an amplifier, the terminal 48*b* is electrically connected to the power supply point of the power supply unit, and the terminals 48*c* and 48*d* are electrically connected to an external ground, for example. More specifically, the capacitor 46 is connected between the terminals 48*a* and 48*b*, the inductor 44 is connected at one end to one end of the capacitor 46 and at the other end to a position which is at a ground potential (the same potential as the terminals 48*c* and 48*d*), and the inductor 45 is connected at one end to the other end of the capacitor 46 and at the other end to a position which is at a ground potential (the same potential as the terminals 48*c* and 48*d*).

In the configuration in which a I-form high-pass filter, such as the high-pass filter 40B, is connected to the antenna 20, a portion between the antenna 20 and an external ground becomes nearly in the short circuit state in the first frequency band. Isolation between the antennas 10 and 20 can thus be secured in the short circuit state in the first frequency band.

The filter form of the high-pass filter is not restricted to the T form or the Π form, and may be another filter form, such as a Chebyshev filter, a Butterworth filter, or a Bessel filter.

Figure 6:
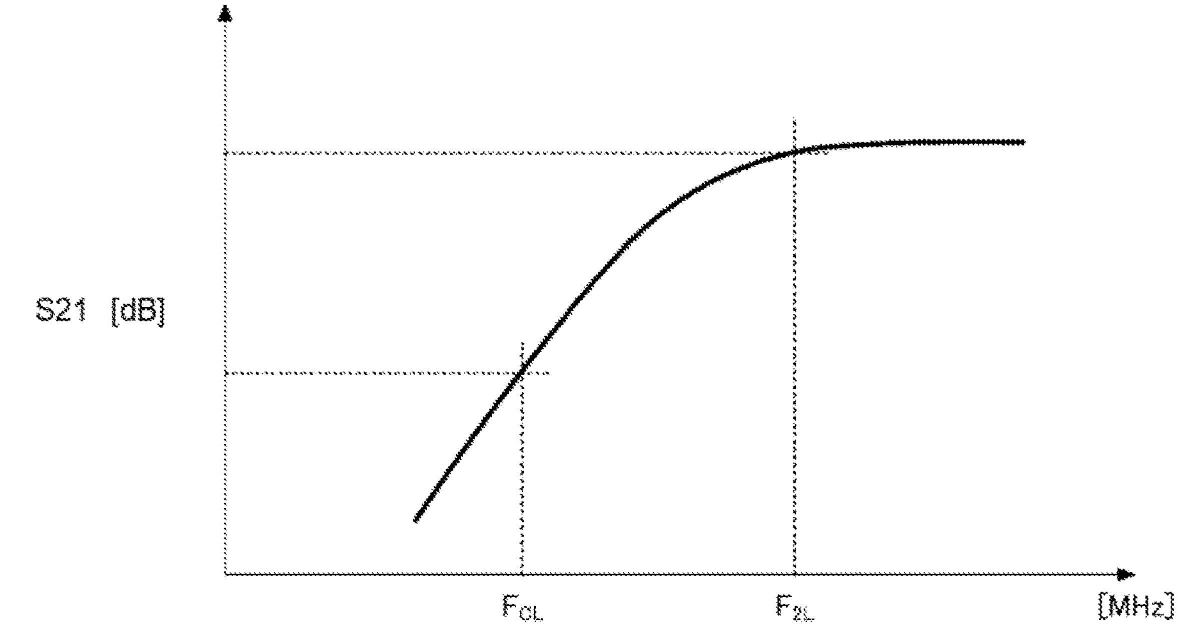
FIG. 6 is a graph illustrating an example of the filter characteristics of a high-pass filter.

FIG. 6 is a graph illustrating an example of the filter characteristics of a high-pass filter. The lowest frequency of the second frequency band is represented by $F_{2L}$, and the frequency which is lower than the frequency $F_{2L}$ and at which the transmission coefficient S21 decreases by 10 decibels (dB) is set to the cutoff frequency $F_{CL}$. In this example, the transmission coefficient S21 represents the degree of transmission of a radio-frequency signal from the input terminal to the output terminal of the high-pass filter. As the value of the transmission coefficient S21 is lower, the isolation is higher. It is preferable that the high-pass filter 40 satisfy the following expression 1a to secure the isolation between the antennas 10 and 20 in the first frequency band.

$$F_{2L}/3 \leqq F_{CL} < F_{2L}$$ Expression 1a

This can reduce the degradation of the transmission/reception sensitivity of each of the antennas 10 and 20 even though the antennas 10 and 20 are placed proximate to each other.

Figure 7:
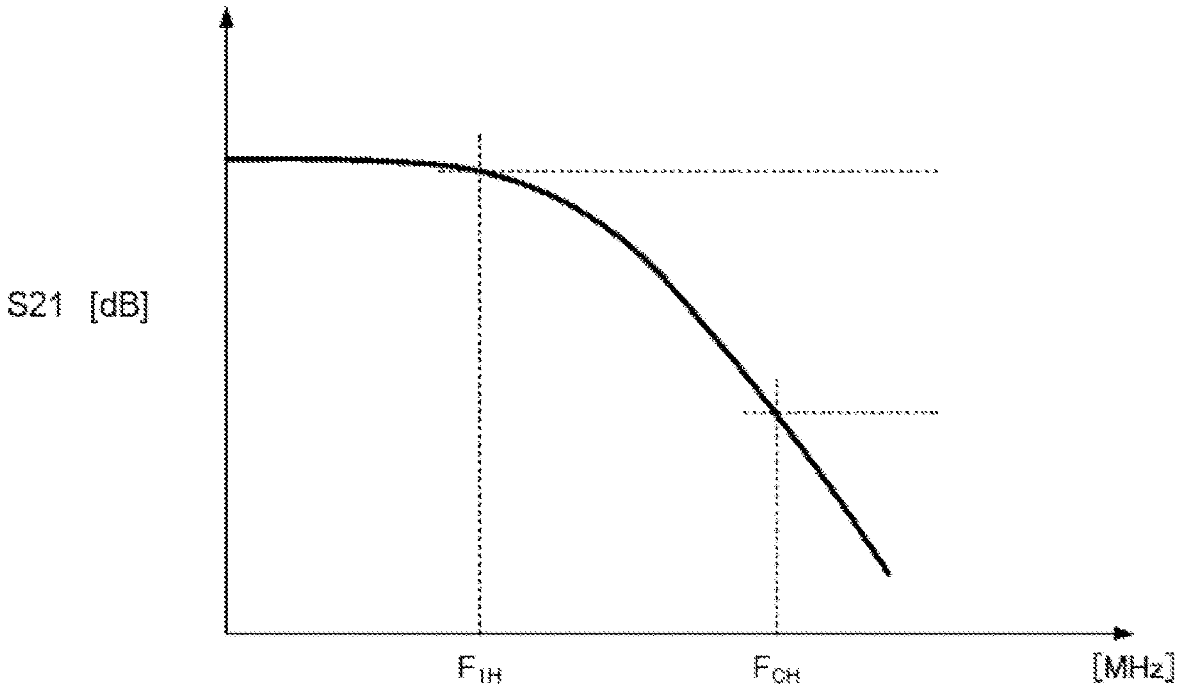
FIG. 7 is a graph illustrating an example of the filter characteristics of a low-pass filter.

To secure the isolation between the antennas 10 and 20 in the first frequency band, the high-pass filter 40 preferably satisfies the following expression 1b, and more preferably, the following expression 1c.

$$F_{2L}/2 \leqq F_{CL} < F_{2L}$$ Expression 1b $$F_{2L}/1.5 \leqq F_{CL} < F_{2L}$$ Expression 1c FIG. 7 is a graph illustrating an example of the filter characteristics of a low-pass filter. The highest frequency of the first frequency band is represented by $F_{1H}$, and the frequency which is higher than the frequency $F_{1H}$ and at which the transmission coefficient S21 decreases by 10 decibels (dB) is set to the cutoff frequency $F_{CH}$. In this example, the transmission coefficient S21 represents the degree of transmission of a radio-frequency signal from the input terminal to the output terminal of the low-pass filter. As the value of the transmission coefficient S21 is lower, the isolation is higher. It is preferable that the low-pass filter 30 satisfy the following expression 2a to secure the isolation between the antennas 10 and 20 in the second frequency band.

$$F_{1H} < F_{CH} \leqq 1.5 \times F_{1H}$$ Expression 2a

This can reduce the degradation of the transmission/reception sensitivity of each of the antennas 10 and 20 even though the antennas 10 and 20 are placed proximate to each other.

Figure 8:
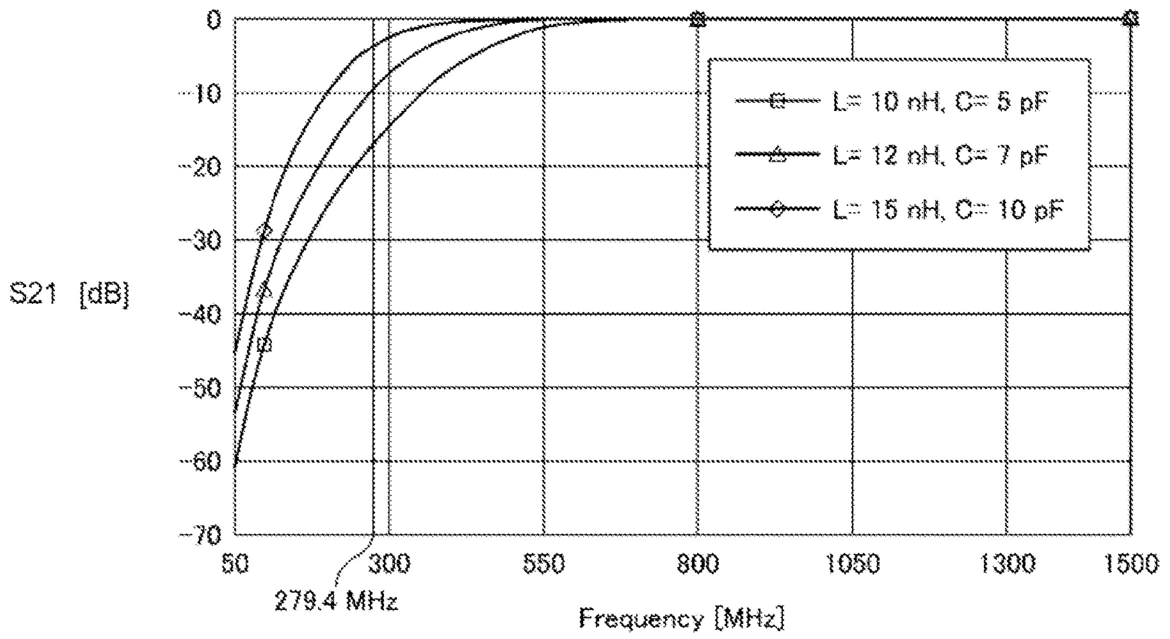
FIG. 8 is a graph illustrating the filter characteristics of a T-form high-pass filter shown in FIG. 4.

To secure the isolation between the antennas 10 and 20 in the second frequency band, the low-pass filter 30 preferably satisfies the following expression 2b, and more preferably, the following expression 2c.

$$F_{1H} < F_{CH} \leqq 1.75 \times F_{1H}$$ Expression 2b $$F_{1H} < F_{CH} \leqq 2.0 \times F_{1H}$$ Expression 2c FIG. 8 is a graph illustrating the filter characteristics of the T-form high-pass filter shown in FIG. 4. In the legend in the graph, L is the inductance of the inductor 43, and C is the capacitance of the capacitors 41 and 42. For example, in a case where the lowest frequency $F_{2L}$ of the second frequency band is 800 MHZ, $F_{2L}/3$ is 267 MHZ, and thus a T-form high pass filter having "L=10 nH, C=5 pF" or "L=12 nH, C=7 pF" satisfies expression 1a discussed above.

Figure 9:
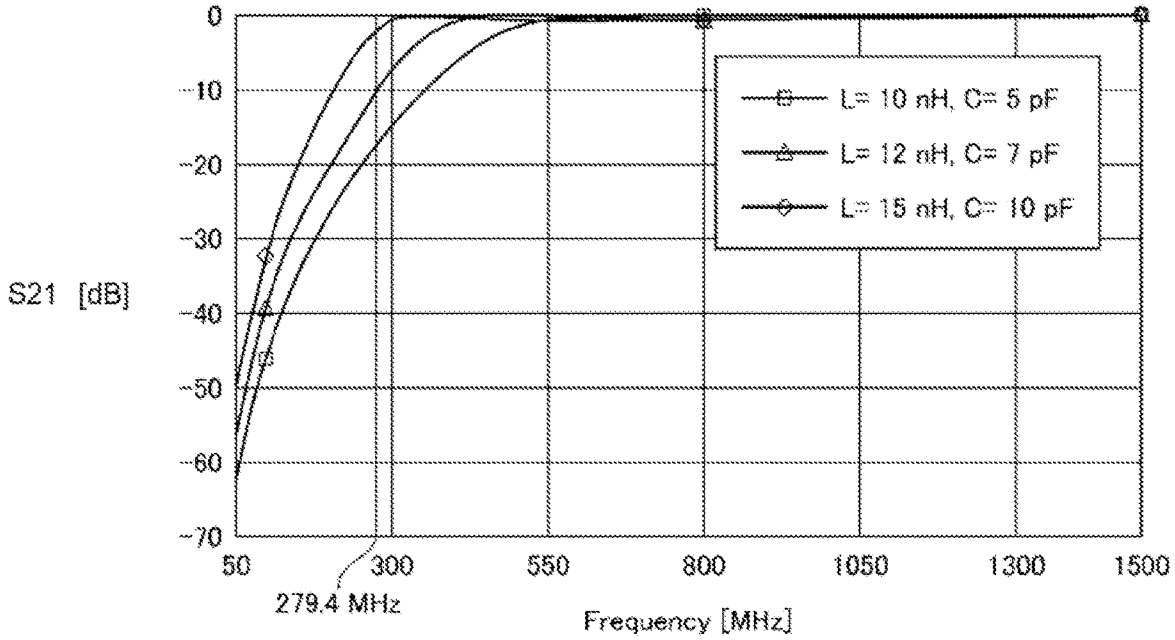
FIG. 9 is a graph illustrating the filter characteristics of a I-form high-pass filter shown in FIG. 5.

FIG. 9 is a graph illustrating the filter characteristics of the I-form high-pass filter shown in FIG. 5. In the legend in the graph, L is the inductance of the inductors 44 and 45, and C is the capacitance of the capacitor 46. For example, in a case where the lowest frequency $F_{2L}$ of the second frequency band is 800 MHZ, $F_{2L}/3$ is 267 MHZ, and thus a ∏-form high pass filter having "L=10 nH, C=5 pF" or "L=12 nH, C=7 pF" satisfies expression 1a discussed above.

The embodiment has been discussed above. However, the technology of the present disclosure is not limited to the above-described embodiment. Various modifications and improvements may be made. For example, the embodiment may be combined with or replaced by part of or the entirety of another embodiment.

For example, the antenna 10 may be installed on the window glass 1, while the antenna 20 may be installed in the vicinity of the window glass 1. Conversely, the antenna 10 may be installed in the vicinity of the window glass 1, while the antenna 20 may be installed on the window glass 1. The mode in which the antenna is installed on the window glass may be a mode in which the antenna is installed on the surface of the window glass or is sealed in the window glass. Specific examples of the vicinity of the window glass may be locations in or on the vehicle separated from the window glass, and may be the roof, console, pillars, garnishes, and mirrors. The mode in which the antenna is installed in the vicinity of the window glass 1 may be a mode in which the antenna is installed on a member attached to the window glass or to a member in the vicinity of the window glass.

REFERENCE SYMBOLS

1: window glass
1*a* to 1*d*: glass edge
5: light shielding film
5*a*: inner edge
10, 10A: antenna
11, 12: ground element
13, 14, 15: antenna element
16: power supply unit
17: ground point
18: power supply point
20, 20A: antenna
21: power supply unit
22: power supply point
23: ground point
24: slot
25: conductive film
26: antenna element
27: ground element
30: low-pass filter
40: high-pass filter
100: antenna device

What is claimed is:

1. A vehicle antenna device to be mounted on a vehicle, comprising:
- a first antenna capable of transmitting and receiving radio waves of a first frequency band; and
- a second antenna proximate to the first antenna and capable of transmitting and receiving radio waves of a second frequency band including a frequency band higher than the first frequency band,
- wherein at least one of the first antenna and the second antenna is disposed in or on window glass of the vehicle or in the vicinity of the window glass,
- wherein the second antenna includes a power supply unit to which a high-pass filter is connected, and
- wherein noise containing components of the first frequency band leaking from the first antenna to the second antenna are suppressed by the high-pass filter.

2. The vehicle antenna device according to claim 1, wherein the first antenna and the second antenna are separated from each other with a distance of 5 to 100 mm.

3. The vehicle antenna device according to claim 1, wherein the following expression is satisfied:

$$F_{2L}/3 \leqq F_{CL} < F_{2L}$$

where $F_{2L}$ is a lowest frequency of the second frequency band, and $F_{CL}$ is a cutoff frequency which is lower than the frequency $F_{2L}$ and at which a transmission coefficient decreases by 10 decibels.

4. The vehicle antenna device according to claim 1, wherein the first antenna includes a power supply unit to which a low-pass filter is connected.

5. The vehicle antenna device according to claim 4, wherein the low-pass filter satisfies the following expression:

$$F_{1H} < F_{CH} \leqq 1.5 \times F_{1H}$$

where $F_{1H}$ is a highest frequency of the first frequency band, and $F_{CH}$ is a cutoff frequency which is higher than the frequency $F_{1H}$ and at which a reflection coefficient decreases by 10 decibels.

6. The vehicle antenna device according to claim 1, wherein the second frequency band is in a range of 617 MHz and higher.

7. The vehicle antenna device according to claim 6, wherein the second frequency band includes a 2.4 GHz band.

8. The vehicle antenna device according to claim 6, wherein the second frequency band includes at least one of a 5.2 GHz band, a 5.3 GHz band, and a 5.6 GHz band.

9. The vehicle antenna device according to claim 6, wherein the second frequency band includes at least one of a 5.8 GHz band and a 5.9 GHz band.

10. The vehicle antenna device according to claim 1, wherein the high-pass filter includes at least one of a T-form high-pass filter, a Π-form high-pass filter, a Chebyshev high-pass filter, a Butterworth high-pass filter, and a Bessel high-pass filter.

11. The vehicle antenna device according to claim 10, wherein the high-pass filter is a T-form high-pass filter.

12. The vehicle antenna device according to claim 10, wherein the high-pass filter is a Π-form high-pass filter.

13. The vehicle antenna device according to claim 1, wherein the second antenna is a dipole planar antenna.

14. The vehicle antenna device according to claim 1, wherein the second antenna is a monopole planar antenna.

15. The vehicle antenna device according to claim 1, wherein the second antenna is a patch antenna.

16. The vehicle antenna device according to claim 1, wherein the first frequency band includes a digital terrestrial television broadcast band.

17. The vehicle antenna device according to claim 1, wherein the first frequency band includes a band III of DAB broadcast.

18. The vehicle antenna device according to claim 1, wherein:

the first antenna is disposed in or on the window glass; and the second antenna is disposed in or on the window glass or in the vicinity of the window glass.

19. The vehicle antenna device according to claim 1, wherein the window glass includes a windshield.

20. The vehicle antenna device according to claim 1, wherein the window glass includes rear glass.

* * * * *